April 29, 1952 A. V. BEDFORD 2,594,383

REGISTRATION MONITORING

Filed Sept. 29, 1948 2 SHEETS—SHEET 1

Inventor
ALDA V. BEDFORD
By Olin O. Mitchell
Attorney

April 29, 1952

A. V. BEDFORD 2,594,383

REGISTRATION MONITORING

Filed Sept. 29, 1948

2 SHEETS—SHEET 2

Inventor

ALDA V. BEDFORD

By Clive J. Mitchell

Attorney

Patented Apr. 29, 1952

2,594,383

UNITED STATES PATENT OFFICE 2,594,383

REGISTRATION MONITORING

Alda V. Bedford, Princeton, N. J., assignor to Radio Corporation of America, a corporation of Delaware Application September 29, 1948, Serial No. 51,717

13 Claims. (Cl. 178—5.2)

This invention relates to electrical monitors and more particularly to image registration monitors for color television system and the like.

It has become quite well known to the television art that the transmission of images in finite detail and discontinuous or limited motion by electrical transmission mediums has best been solved by the process of scanning which consists of moving an exploring element, spot or point over the image to be transmitted in a periodically repeating scanning path covering substantially the total image area. The exploring element generates a signal which is indicative of the brightness of the image area at its instantaneous position. The signal is then transmitted over the communication channel to the reproducing station where a like spot or point of brightness is controlled by the signal and whose movement is in synchronism with the exploring point at the transmitting station. The movement of the exploring point at the receiving station in synchronism with the exploring point at the transmitting station causes the image to be reproduced.

As is well known to the television art images in substantially their natural color may be reproduced at a remote location by not only dividing the images into elemental areas and transmitting electrical signals representative of the light intensity of the various elemental areas taken in an orderly sequence of scanning, but by also dividing the image into selected component colors and separately transmitting information relating to the separated selected component color images and reconstructing the color image at the receiving station by combining the several images in registry.

It will be appreciated, however, that the superpositioning in registry of the various component color images must be accomplished to a reasonable degree of accuracy in order to provide for satisfactory natural color images. An important factor is, of course, the accurate registry of the several image pickup devices at the transmitting station.

Various arrangements have been proposed for mechanically and electrically registering each of a plurality of scanning devices. In order, however, to successfully employ such devices it is necessary to have accurate information regarding any misregistration.

In my copending application entitled "Registration Monitoring," Serial No. 48,391, filed September 9, 1948, certain methods and arrangements are shown and described for accurately indicating registration of multiple scanning devices. In my copending application referred to immediately above, an electrical comparison is made between two of a plurality of signal trains and corresponding image elemental area registration is indicated on the screen of a cathode ray tube.

According to this invention still other methods and arrangements are provided for accurately indicating registration of multiple scanning devices. According to this invention a monitorscope is provided with scanning synchronized with the scanning of the image pickup devices. Arrangements are provided for alternately applying the image signals of any two of said image signal producing component color cameras to the monitorscope at a frequency greater than the scanning frequency. In certain forms of the invention means are provided for changing the image background illumination in the monitorscope for each of the image signals applied to the monitor.

It will be seen therefore that by properly selecting the rate of change of the application of different image signals to the monitorscope a pattern may be obtained on the monitorscope which will be an accurate indication of registry at any point on the image area.

A primary object of this invention is to provide for improved multiple image registration indication.

Another object of this invention is to provide for more accurately registered image signals of a simultaneous type color television type system.

Still another object of this invention is to provide for simple and accurate monitoring of the registration of the various component color image scannings in a color image pickup device.

Other and incidental objects of the invention will be apparent to those skilled in the art from a reading of the following specification and an inspection of the accompanying drawings in which.

Figure 3:
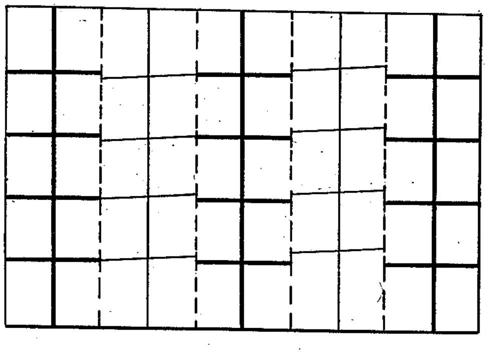
Figure 4:
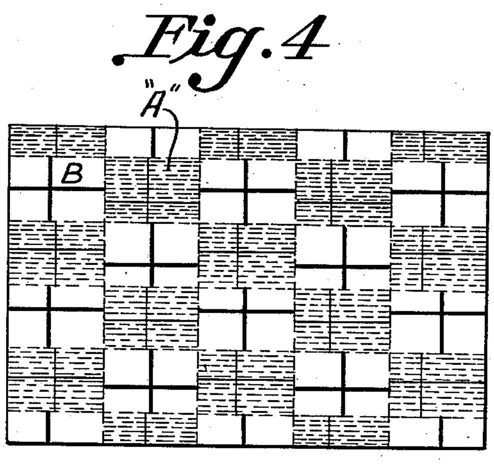

Figures 3 and 4 indicate typical patterns which may be obtained on the monitorscope to indicate misregistration.

When three pickup tubes of the type employed in a simultaneous type color television system are used in producing component color image representative signal trains the deflection of the several tubes may differ. This as well as optical maladjustment may cause the several color image representative signals occurring at any one instant to correspond to different points in the subject being televised. We may then say that the signals "misregister" since they would produce misregistered images on an ideal receiver. An ideal receiver would give a perfectly registered image when supplied with a perfect signal. If the receiver also had registrational inaccuracies of its own, the resulting picture might be better or worse depending upon the relative polarities and magnitudes of the inaccuracies of the signal and of the receiver. Such a receiver, therefore, cannot be a good monitor for revealing the registration of the transmitted signal.

There is provided in accordance with the invention, a monitor involving no problems of registry in its operation which indicates registration of a plurality of different signals. The monitor indicates registration or misregistration by black and white indications on the screen of the monitorscope.

In the explanation of the operation of this invention an arrangement will be shown and described which is particularly applicable to the indication of registration in a three color simultaneous type television transmitter employing a blue component color image, a red color component image, and a green color component image. Registration indication between the several different color component image representative signals is accomplished by employing keying means which alternately applies the green image representative signals and then the red image representative signals to the monitorscope so that certain areas of the image formed on the monitorscope are produced by the green signal while the other and adjacent areas are reproduced from the red signal. The areas may, for example, be in the form of the squares of a checkerboard.

Figure 1:
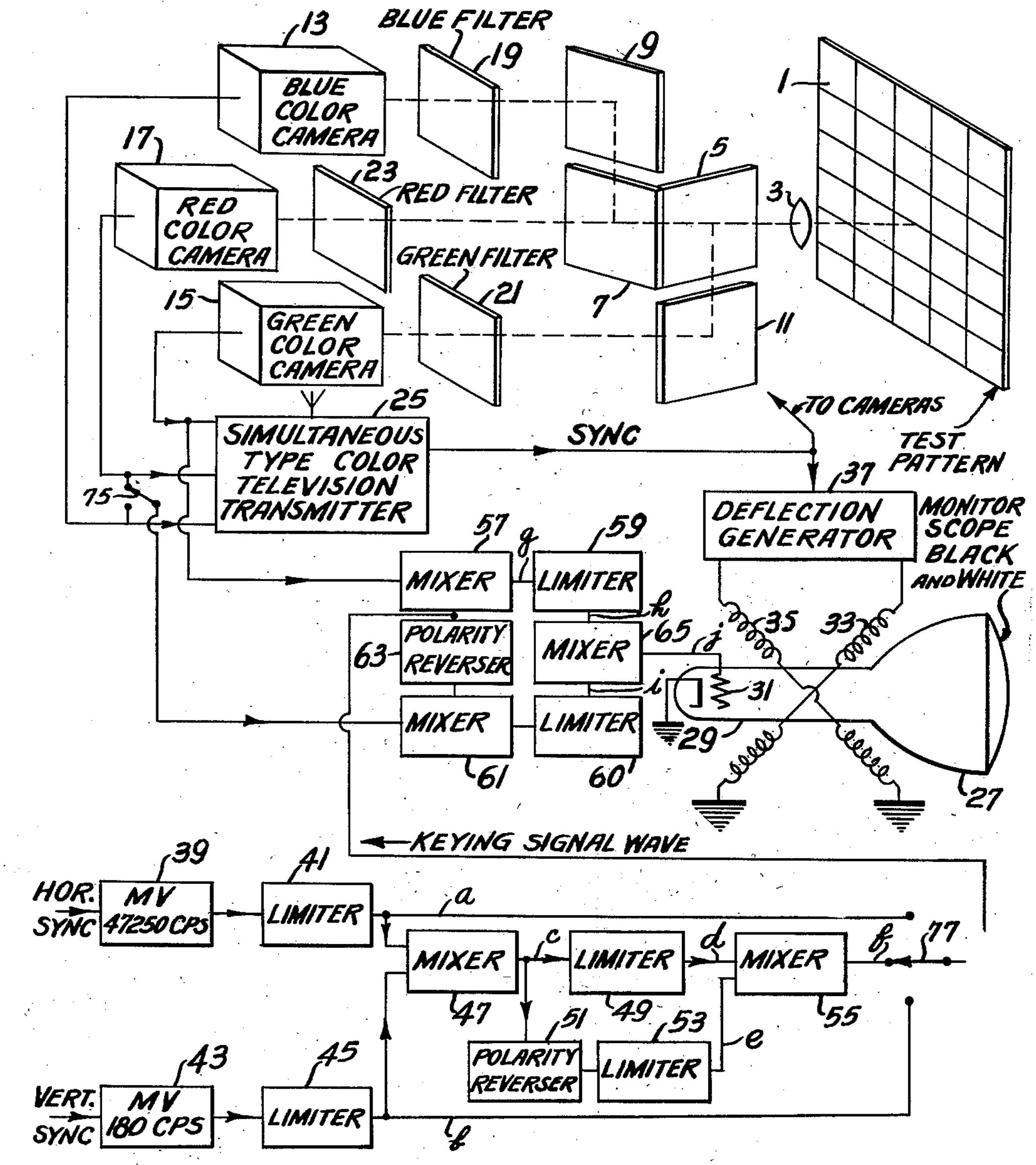
Figure 1 shows by block diagram one form of this invention.

Turning now in more detail to Figure 1 there is shown an image pickup arrangement of the simultaneous type.

A test pattern 1 is illustrated as a black and white cross-sectional placard. An optical system including a lens 3 projects light from test pattern 1 through dichroic mirrors 5 and 7 wherein, in accordance with the operation of dichroic mirrors, light from the test pattern 1 is divided into several selected component colors. Mirrors 9 and 11 are positioned to direct the component color images to the color cameras 13, 15, and 17 which are designated as blue, green, and red color cameras, respectively.

Although not essential for color separation when dichroic mirrors are employed appropriate color filters 19, 21, and 23 are included in the optical paths.

In accordance with the well known practice the color cameras 13, 15, and 17 provide a simultaneous type signal involving the several different component color representative signal trains to the simultaneous type color television transmitter illustrated by block 25.

It will of course be seen that the optical, mechanical, and electrical characteristics of the several color cameras may differ slightly from each other and cause misregistration of the several images at the receiver. It is therefore important that the adjustments be made in the image pickup arrangement to provide image representative signals which are derived from accurately registered scanning.

Cathode ray tube 27, termed "monitorscope," includes the customary electrode gun 29, an intensity control electrode 31, and associated horizontal and vertical deflection coils 33 and 35. Monitorscope 27 may, for eaxmple, take the form of a kinescope.

The deflecting coils 33 and 35 receive their energy from deflection generator 37 which is synchronized at the same frequency that is employed to synchronize the scanning of the several cameras 13, 15, and 17.

Appropriate switching and selecting of the several different component color representative signal trains for reference on the screen of the monitorscope is accomplished in a series of multivibrators, limiters, mixers, and polarity reversers whose combination and operation will now be described.

Multivibrator 39 which is synchronized in its operation by the horizontal synchronizing signal as indicated in the drawing, has a frequency of 47,250 cycles per second and is arbitrarily set and locked in at three times the line scanning frequency of 15,750 cycles per second. The limiter 41 shapes the output signal of multivibrator 39 so that a square wave is produced as shown in curve *a* of Figure 2.

The multivibrator 43 produces a 180 cycle per second wave. Multivibrator 43 is synchronized by the vertical synchronizing signal as indicated. The output signal of multivibrator 43 is passed through limiter 45 to form a wave similar to that shown in curve *b* of Figure 2. The signals from limiter 41 and limiter 45 are combined in mixer 47. The output signal of mixer 47 takes the form of curve *c* in Figure 2.

Limiter 49 is adjusted to pass only the upper part of the signal wave obtained from mixer 47. The output signal wave of limiter 49 will take the form of the wave indicated graphically as curve *d* in Figure 2.

The polarity reversing amplifier stage indicated by block 51 reverses the wave obtained from mixer 47. Limiter 53 produces a wave which takes the form of the curve *e* shown in Figure 2.

Figure 2:
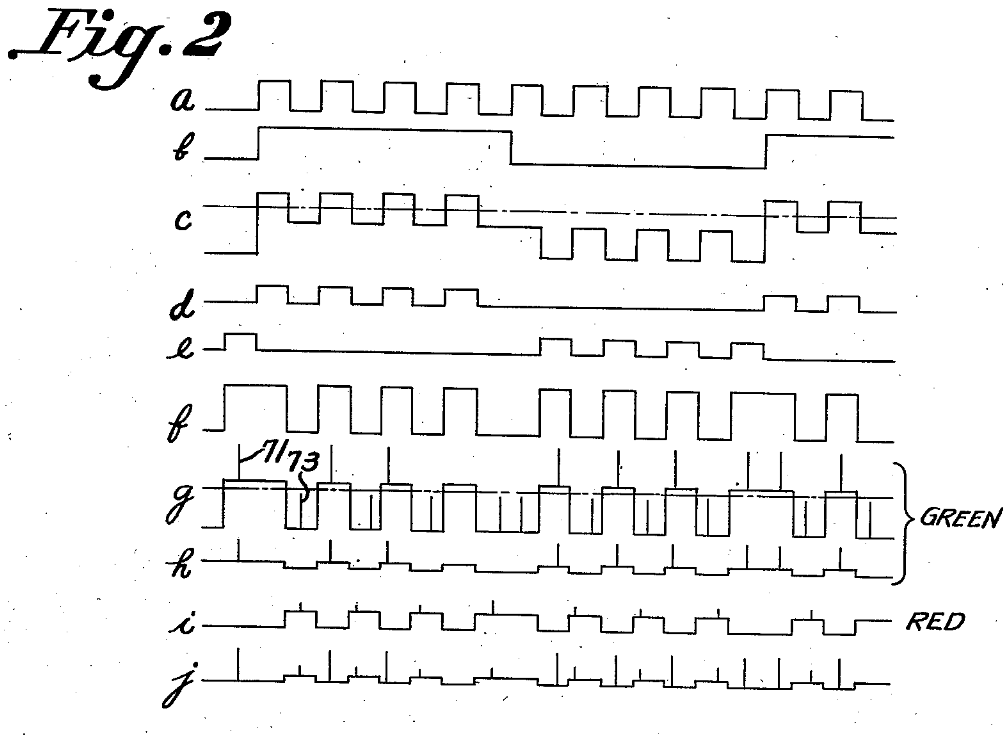
Figure 2 shows graphically the operation of this invention.

The signal waves *d* and *e* of Figure 2 obtained from limiters 49 and 53 respectively are combined in mixer 55 to form a signal wave of the type indicated by curve *f* of Figure 2. The signal wave obtained from mixer 55 and shown by curve *f* in Figure 2 will be termed "the keying signal wave."

Signal from the green color camera 15 is supplied to mixer 57 wherein it is combined with the keying signal wave. The result of combining the video signal from the green color camera 15 with the keying signal wave in mixer 57 produces a wave taking the form of curve *g* of Figure 2. The pips 71 and 73 riding the crest of the wave *g* are representative of the green signal. This wave resulting from the combination and shown as curve *g* is passed through limiter 59 to produce what may be called a keyed green signal wave which is illustrated graphically on Figure 2 as curve *h*.

When switch 75 is in its upper position, as shown, the red image representative signal obtained from red color camera 17 is, in a like manner, keyed by the keying signal wave *f* in reversed polarity by combining the red image representative signal with the keying signal wave in mixer 61 and polarity reverser 63. The resultant wave will take the form of curve *i* of Figure 2 in which the red image representative signal is present only when the green signal is absent in the wave *h*.

Signal waves *h* and *i* are added together in mixer 65 to form wave *j* of Figure 2 which is applied to the control electrode 31 of the kinescope or monitorscope 27.

In the operation of the device the signals produced by the scanning of test pattern 1 an image taking the form of that shown in Figure 4 will result. The dotted lines which divide the image into checkerboard squares serve only to indicate the borders between the areas receiving the green image representative signals and the red image representative signals and would not be reproduced on the image producing screen of monitorscope 27.

The shaded squares indicated in the drawing of Figure 4 represent darker portions of the screen area. In operation the square wave component of curve *j* biases this portion of the signal wave to a lower level. This can be accomplished electrically by having limiters 59 and 60 set to limit the signals passed therethrough at different levels. The shading serves to quickly identify the areas of the screen of the monitorscope receiving the red color representative signal as distinguished from those areas receiving the green color representative signal.

The area identification of the different signal areas may also be aided by having one signal stronger than the other signal. In the drawing the lines representing the green signal are made heavier by reason of the fact that the green signal applied to the control electrode 31 of the monitorscope 27 is stronger. The stronger signal is also indicated by the higher image signal pulses of waves *g* and *h*.

The misregister in both magnitude and direction at various points of the image can be judged directly by noting the offset in the reproduced lines of the test pattern in going from one square to another.

For example, it will be seen that the horizontal line in square A of Figure 4 representing the red signal is not in vertical registry with the heavier line in square B representing the green signal. This indicates that at the vicinity of areas A and B of the image the red scanning at the cameras is low and to the left of the scanning of the green signals.

In the lower position of switch 75, the registration of the blue signal with respect to the green signal may be had. Assuming, for example, that the green signal will be the standard signal, the registration of the blue signal with respect to the green signal can be obtained by switching switch 75 from the red signal to the blue signal channel.

Obviously if both the red and the blue signals are made to register with the green signal, all three signals will be in registry.

By throwing switch 77 to the upper position, the 47,250 cycle per second square wave *a* is used directly for keying the image signal. This results in the pattern illustrated in Figure 3. The pattern illustrated in Figure 3 can be used only for judging the registration in a vertical direction. In Figure 3 the indications resulting from the green signal are again made heavier in order that they may be distinguished from the signal representing the other color. In the practice of this form of the invention the placard 1 need only have horizontal lines.

Similarly by throwing switch 77 to its lower position the horizontal registration can be observed. In the practice of this form of the invention the placard 1 need only have vertical lines.

In accordance with that form of the invention just described, extreme simplicity may be had. In this latter situation the apparatus for combining the two square waves, namely mixer 47, limiter 49, mixer 55, polarity reverser 51, and limiter 53 may be omitted from the circuit.

What is claimed is:

1. An image registry monitor for color television systems of the type employing scanning and including a plurality of different selected component color image signal producing cameras each with associated signal amplifying circuits, said image registry monitor comprising a test pattern having cross lines oriented in substantially horizontal and vertical directions, means positioned to project component color images of said test pattern on all of said different selected component color cameras, a monitorscope having a signal input circuit, and a switching arrangement for alternately applying in respective periods of predetermined durations the image signals of any two of said image signal producing cameras to said signal input circuit.

2. An image registry monitor for color television systems of the type employing scanning and including a plurality of different selected component color image signal producing cameras each with associated signal amplifying circuits, said image registry monitor comprising a test pattern having cross lines oriented in substantially horizontal and vertical directions, means positioned to project component color images of said test pattern on all of said different selected component color cameras, a monitorscope having a signal input circuit, said signal input circuit including a beam intensity control electrode, and an electrical switch for alternately applying in respective periods of predetermined durations the image signals of any two of said image signal producing cameras to said signal input circuit.

3. An image registry monitor for color television systems of the type employing scanning and including substantially red, blue, and green component color image pickup devices each with associated signal amplifying circuits, said image registry monitor comprising a test pattern having cross lines oriented in substantially horizontal and vertical directions, optical means positioned to project component color images of said test pattern on all of said different selected component color image pickup devices, a monitorscope having a signal input circuit, said signal input circuit including a beam intensity control electrode, and an electrical switch for alternately applying in equal periods the image signals of any two of said image signal producing cameras to said signal input circuit.

4. An image registry monitor for systems of the type involving scanning and including a plurality of different selected component color image signal producing cameras each with associated signal amplifying circuits, said image registry monitor comprising a test pattern having cross lines oriented in substantially horizontal and vertical directions, optical means positioned to project component color images of said test pattern on all of said different selected component color cameras, a monitorscope having a signal input circuit, said signal input circuit including a beam intensity control electrode, and an electrical switch for alternately applying the image signals of any two of said image signal producing cameras to said signal input circuit at a frequency greater than said scanning frequency.

5. An image registry monitor for color television systems of the type employing scanning at predetermined horizontal and vertical rates and including a plurality of different selected component color image signal producing cameras each with associated signal amplifying circuits, said image registry monitor comprising a test pattern having cross lines oriented in substantially horizontal and vertical directions, means including an optical system positioned to project component color images of said test pattern on all of said different selected component color cameras, a monitorscope having a signal input circuit, said signal input circuit including a beam intensity control electrode, and an electrical switch for alternately applying the image signals of any two of said image signal producing cameras to said signal input circuit at a frequency greater than said horizontal scanning frequency.

6. An image registry monitor for color television systems of the type employing scanning at predetermined horizontal and vertical rates and including a plurality of different selected component color image signal producing cameras each with associated signal amplifying circuits, said image registry monitor comprising a test pattern having cross lines oriented in substantially horizontal and vertical directions, means including an optical system positioned to project component color images of said test pattern on all of said different selected component color cameras, a monitorscope having a signal input circuit, said signal input circuit including a beam intensity control electrode, and an electrical switch for alternately applying the image signals of any two of said image signal producing cameras to said signal input circuit at a frequency greater than said vertical scanning frequency.

7. An image registry monitor for color television systems of the type employing scanning at predetermined horizontal and vertical rates and including a plurality of different selected component color image signal producing cameras each with associated signal amplifying circuits, said image registry monitor comprising a test pattern having cross lines oriented in substantially horizontal and vertical directions, an optical system including a lens positioned to project component color images of said test pattern on all of said different selected component color cameras, a monitorscope having a signal input circuit, said signal input circuit including a beam intensity control electrode, and an electrical switch for alternately applying the image signals of any two of said image signal producing cameras to said signal input circuit at a repetition rate equal to the rate of interception of the vertically orientated cross lines by the horizontal scanning.

8. An image registry monitor for color television systems of the type employing scanning at predetermined horizontal and vertical rates and including a plurality of different selected component color image signal producing cameras each with associated signal amplifying circuits, said image registry monitor comprising in combination a test pattern having cross lines oriented in substantially horizontal and vertical directions, an optical system including a lens positioned to project component color images of said test pattern on all of said different selected component color cameras, a kinescope having a signal input circuit and having cathode ray beam deflection of the same rate as the deflection rate of said image signal producing cameras, said signal input circuit including a beam intensity control electrode, an electrical switch electrically connected between said beam intensity control electrode input circuit and either one of any two of said image signal producing cameras for alternately connecting the image signal producing cameras to said signal input circuit at a frequency greater than the faster of the horizontal or vertical scanning frequency.

9. An image registry monitor for color television systems of the type employing scanning at predetermined horizontal and vertical rates and including a plurality of different selected component color image signal producing cameras each with associated signal amplifying circuits, said image registry monitor comprising in combination a test pattern having cross lines oriented in substantially horizontal and vertical directions, an optical system including a lens positioned to project different component color images of said test pattern on each of said different selected component color cameras, a kinescope having a signal input circuit and having cathode ray beam deflection of the same rate as the deflection rate of said image signal producing cameras, said signal input circuit including a beam intensity control electrode, an electrical switch electrically connected between said control electrode and either one of any two of said image signal producing cameras for alternately connecting the image signal producing cameras to said signal input circuit, and means for actuating said switch at a frequency greater than said scanning frequency.

10. An image registry monitor for color television systems of the type employing scanning at predetermined horizontal and vertical rates and including a plurality of different selected component color image signal producing cameras each with associated signal amplifying circuits, said image registry monitor comprising in combination a test pattern having cross lines oriented in substantially horizontal and vertical directions, means including a lens positioned to project different component color images of said test pattern on each of said different selected component color cameras, a kinescope having a signal input circuit and having cathode ray beam deflection of the same rate as the deflection rate of said image signal producing cameras, said signal input circuit including a beam intensity control electrode, an electrical switch electrically connected between said control electrode and either one or any two of said image signal producing cameras for alternately connecting the image signal producing cameras to said signal input circuit, and means for identifying the image background illumination in said kinescope for each of said image signals applied to said kinescope.

11. An image registry monitor for color television systems of the type employing scanning at predetermined horizontal and vertical rates and including a plurality of different selected component color image signal producing cameras each with associated signal amplifying circuits, said image registry monitor comprising in combination a test pattern having cross lines oriented in substantially horizontal and vertical directions, means including a lens positioned to project component color images of said test pattern on all of said different selected component color cameras, a kinescope having a signal input circuit and having cathode ray beam deflection of the same rate as the deflection rate of said image signal producing cameras, said signal input circuit including a beam intensity control electrode, an electrical switch electrically connected between said control electrode and either one of any two of said image signal producing cameras for alternately connecting the image signal producing cameras to said signal input circuit, and means for differently controlling the image background illumination in said kinescope for each different of said image signals applied to said control electrode.

12. An image registry monitor for color television systems of the type employing scanning at predetermined horizontal and vertical rates and including a plurality of different selected component color image signal producing cameras each with associated signal amplifying circuits, said image registry monitor comprising in combination a test pattern having cross lines oriented in substantially horizontal and vertical directions, means including a lens positioned to project component color images of said test pattern on all of said different selected component color cameras, a kinescope having a signal input circuit and having cathode ray beam deflection of the same rate as the deflection rate of said image signal producing cameras, said signal input circuit including a beam intensity control electrode, an electrical switch electrically connected between said control electrode and either one of any two of said image signal producing cameras for alternately connecting the image signal producing cameras to said signal input circuit, and means for changing the image background illumination in said kinescope for each of said image signal applied to said kinescope.

13. An image registry monitor for color television systems of the type employing scanning at predetermined horizontal and vertical rates and including a plurality of different selected component color image signal producing cameras each with associated signal amplifying circuits, said image registry monitor comprising in combination a test pattern having cross lines oriented in substantially horizontal and vertical directions, means including a lens positioned to project component color images of said test pattern on all of said different selected component color cameras, a kinescope having a signal input circuit and having cathode ray beam deflection of the same rate as the deflection rate of said image signal producing cameras, said signal input circuit including a beam intensity control electrode, an electrical switch electrically connected between said control electrode and either one of any two of said image signal producing cameras for alternately connecting the image signal producing cameras to said signal input circuit, and kinescope background control actuated by said electrical switch for changing the image background illumination in said kinescope for each of said image signals applied to said monitor, said electrical switch and kinescope background control consisting of a multivibrator keyed at a rate faster than the scanning in one direction.

ALDA V. BEDFORD.

REFERENCES CITED

The following references are of record in the file of this patent:

UNITED STATES PATENTS

| Number | Name | Date |
|---|---|---|
| 2,073,370 | Goldsmith | Mar. 9, 1937 |
| 2,335,180 | Goldsmith | Nov. 23, 1943 |
| 2,389,646 | Sleeper | Nov. 27, 1945 |